(12) United States Patent
Choi et al.

(10) Patent No.: US 7,924,953 B2
(45) Date of Patent: Apr. 12, 2011

(54) APPARATUS AND METHOD FOR DETECTING TIME-FREQUENCY CODE IN MB-OFDM UWB SYSTEM

(75) Inventors: Sung-Woo Choi, Daejon (KR); Cheol-Ho Shin, Daejon (KR); Kyu-Min Kang, Daejon (KR); Sang-Sung Choi, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 746 days.

(21) Appl. No.: 11/948,179

(22) Filed: Nov. 30, 2007

(65) Prior Publication Data

US 2008/0130722 A1    Jun. 5, 2008

(30) Foreign Application Priority Data

Dec. 1, 2006    (KR) ........................ 10-2006-0120834

(51) Int. Cl.
*H04L 27/06* (2006.01)
*H04L 7/00* (2006.01)
*H04B 1/69* (2006.01)

(52) U.S. Cl. ......... 375/343; 375/344; 375/365; 375/137

(58) Field of Classification Search .................. 375/130, 375/132, 134, 136–138, 140–142, 145, 150, 375/219, 222, 260, 267, 316, 340, 343–344, 375/E1.001; 370/208–209, 295, 319, 330, 370/344, 347, 436, 509–515; 455/67.13, 455/77, 120, 125, 150.1, 154.1, 154.19, 205, 455/214, 161.1, 164.2, 188, 192.1, 192.2

See application file for complete search history.

(56) References Cited

U.S. PATENT DOCUMENTS 7,454,218 B2 * 11/2008 Mo et al. ........................ 455/502
7,567,533 B2 *  7/2009 Lai ................................ 370/330
(Continued)

FOREIGN PATENT DOCUMENTS

KR    1020050035655    4/2005
(Continued)

OTHER PUBLICATIONS

Lai et al., A Robust Band-Tracking Packet Detector (BT-PD) in OFDM-Based Ultra-Wideband Systems, 2006, Signal Processing Systems Design and Implementatio, 2006. SIPS '06. IEEE Workshop on, pp. 165-170.*

*Primary Examiner* — Tesfaldet Bocure
*Assistant Examiner* — Lawrence B Williams
(74) *Attorney, Agent, or Firm* — Ladas & Parry LLP

(57) ABSTRACT

Provided is an apparatus and method for detecting a time-frequency code in an MB-OFDM UWB system. The apparatus includes a controller for providing a band selection signal to the RF receiver and outputting a preamble selection signal at regular symbol periods to calculate a cross correlation value for a predetermined time period more than a beacon frame interval when a time-frequency code search start signal is received; and a cross correlator for storing information on preamble patterns, selecting a preamble stored depending on the preamble selection signal, and calculating a cross correlation value for a digital signal transferred through the RF receiver, wherein the controller determines a time-frequency code using a preamble where a peak occurs as a time-frequency code that is currently in use when a peak signal is inputted based on the calculated cross correlation value, and transmits the determined time-frequency code to the MAC receiver.

11 Claims, 5 Drawing Sheets

U.S. PATENT DOCUMENTS

| | | | |
|---|---|---|---|
| 7,769,074 B2 * | 8/2010 | Nakache et al. | 375/132 |
| 2005/0159106 A1 * | 7/2005 | Palin et al. | 455/41.2 |
| 2005/0176371 A1 * | 8/2005 | Palin et al. | 455/41.2 |
| 2005/0177639 A1 * | 8/2005 | Reunamaki et al. | 709/227 |
| 2005/0190817 A1 | 9/2005 | Batra et al. | |
| 2005/0265219 A1 | 12/2005 | Murphy et al. | |
| 2006/0029018 A1 * | 2/2006 | Mizukami et al. | 370/328 |
| 2007/0054680 A1 * | 3/2007 | Mo et al. | 455/502 |
| 2007/0064744 A1 * | 3/2007 | Aytur et al. | 370/503 |

FOREIGN PATENT DOCUMENTS

| | | |
|---|---|---|
| KR | 1020050099163 | 10/2005 |
| KR | 1020060070901 | 6/2006 |
| KR | 1020060114590 | 11/2006 |
| KR | 1020060130014 | 12/2006 |
| WO | 2006/014342 | 2/2006 |

* cited by examiner

US 7,924,953 B2

APPARATUS AND METHOD FOR DETECTING TIME-FREQUENCY CODE IN MB-OFDM UWB SYSTEM

CROSS-REFERENCE TO RELATED APPLICATIONS

The present invention claims priority of Korean Patent Application No. 10-2006-0120834, filed on Dec. 01, 2006, which is incorporated herein by reference.

BACKGROUND OF THE INVENTION

1. Field of the Invention

The present invention relates to an apparatus and method for detecting a time-frequency code in a Multi-Band Orthogonal Frequency Division Multiplexing Ultra Wideband (MB-OFDM UWB) system; and, more particularly, to an apparatus and method for easily detecting a time-frequency code that is currently in use in an MB-OFDM UWB system using time-frequency codes.

This work was supported by the Information Technology (IT) research and development program of the Korean Ministry of Information and Communication (MIC) and the Korean Institute for Information Technology Advancement (IITA) [2006-S-071-01, "Development of UWB Solution for High Speed Multimedia Transmission"].

2. Description of Related Art

As well-known in the art, an MB-OFDM UWB system uses the same time-frequency codes between systems constituting a piconet. The piconet refers to a radio Ad hoc communication system that enables a plurality of independent data devices to communicate with each other. The concept of such a piconet is illustrated in FIG. 1. A new device should detect time-frequency codes being used in the piconet in order to access thereto. That is, it should first detect the time-frequency codes and then receive beacon data, to thereby communicate data with other devices within the piconet in synchronism with them.

In the MB-OFDM UWB system, band groups 1 to 4 consisting of three subbands use time-frequency codes for seven kinds of channels. A time-frequency code for each channel of the band group 1 of the MB-OFDM UWB system is as follows:

TABLE 1

| Channel | Type of preamble | Time-frequency code (length = 6) | | | | | |
|---|---|---|---|---|---|---|---|
| 1 | 1 | 1 | 2 | 3 | 1 | 2 | 3 |
| 2 | 2 | 1 | 3 | 2 | 1 | 3 | 2 |
| 3 | 3 | 1 | 1 | 2 | 2 | 3 | 3 |
| 4 | 4 | 1 | 1 | 3 | 3 | 2 | 2 |
| 5 | 5 | 1 | 1 | 1 | 1 | 1 | 1 |
| 6 | 6 | 2 | 2 | 2 | 2 | 2 | 2 |
| 7 | 7 | 3 | 3 | 3 | 3 | 3 | 3 |

For example, the type 1 of preamble is used for the channel 1, and its pattern is transmitted while performing frequency hopping in order of frequency bands 1, 2, 3, 1, 2, 3. The meaning of the frequency hopping according to time is shown in FIG. 2. FIG. 2 represents the frequency hopping according to time, for example, for channels 1, 3, and 6.

A preamble refers to a preset signal which is added in front of section of data to be transmitted and used to detect received signal, adjust the magnitude of a signal, correct frequency error and time error, and the like. The MB-OFDM UWB system has a total of 30 preambles, wherein the first 24 symbols are used to transmit the preambles shown in Table 1 and the other 6 symbols are used for channel estimation of a modem equalizer.

When a new device is registered in a piconet that is currently organized and wants communications, the device has to detect a time-frequency code that is currently in use in the piconet. This process is carried out at a Media Access Control (MAC) layer that controls a physical layer. The MAC layer allocates time more than a beacon interval and receives a signal for a constant time-frequency code. If the signal is demodulated for that interval to read information of the beacon frame, it is determined as a time-frequency code that is currently in use in the piconet. Since the number of types of channels is 7, this process requires scanning works seven times. In each step, the MAC layer and the physical layer continuously communicate control signals and data signals with each other, and therefore, the control is troublesome because of scanning works seven times.

In addition, for the channels 1 to 4, frequency hopping is performed according to time, and when a hopping time of current channel and that of a device desired to access differ from each other, it is impossible to receive a signal. Therefore, there is a need for a method for effectively solving the above problem and detecting time-frequency codes.

SUMMARY OF THE INVENTION

It is, therefore, an object of the present invention to provide an apparatus and method capable of easily detecting a time-frequency code that is currently in use in an MB-OFDM UWB system using time-frequency codes.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

In accordance with an aspect of the present invention, there is provided an apparatus for detecting a time-frequency code in a Multi-Band Orthogonal Frequency Division Multiplexing Ultra Wideband (MB-OFDM UWB) receiving apparatus having a Radio Frequency (RF) receiver, a modem and a Media Access Control (MAC) receiver, the apparatus including: a controller for providing a band selection signal to the RF receiver and outputting a preamble selection signal at regular symbol periods to calculate a cross correlation value for a predetermined time period more than a beacon frame interval when a time-frequency code search start signal is received from the MAC receiver; and a cross correlator for storing information on preamble patterns, selecting a preamble stored depending on the preamble selection signal from the controller, and calculating a cross correlation value for a digital signal transferred through the RF receiver, wherein the controller determines a time-frequency code using a preamble where a peak occurs as a time-frequency code that is currently in use when a peak signal is inputted based on the calculated cross correlation value from the cross correlator, and transmits the determined time-frequency code to the MAC receiver.

In accordance with another aspect of the present invention, there is provided a method for detecting a time-frequency code in a MB-OFDM UWB receiving apparatus having a RF receiver, a modem and a MAC receiver, including the steps of: a) at the modem, receiving a time-frequency code search start signal from the MAC receiver; b) at the modem, selecting a subband depending on a band selection signal and calculating a cross correlation value for an input signal for a predetermined time period more than a beacon frame interval while changing a preamble selection signal; c) at the modem, if a peak is detected based on the cross correlation value calculated in the step b), searching a preamble where the peak occurs; d) at the modem, if a preamble where the peak occurs is searched in the step c), determining a time-frequency code using a preamble where the peak occurs as a time-frequency code that is currently in use; e) at the modem, repeatedly performing the steps b) to d) for all preambles; and f) at the modem, transferring a determined time-frequency code to the MAC receiver.

DESCRIPTION OF SPECIFIC EMBODIMENTS

The advantages, features and aspects of the invention will become apparent from the following description of the embodiments with reference to the accompanying drawings, which is set forth hereinafter, and thus, the present invention will be easily carried out by those skilled in the art. Further, in the following description, well-known arts will not be described in detail if it seems that they could obscure the invention in unnecessary detail.

Hereinafter, preferred embodiments of the present invention will be described in detail with reference to the accompanying drawings.

Figure 1:
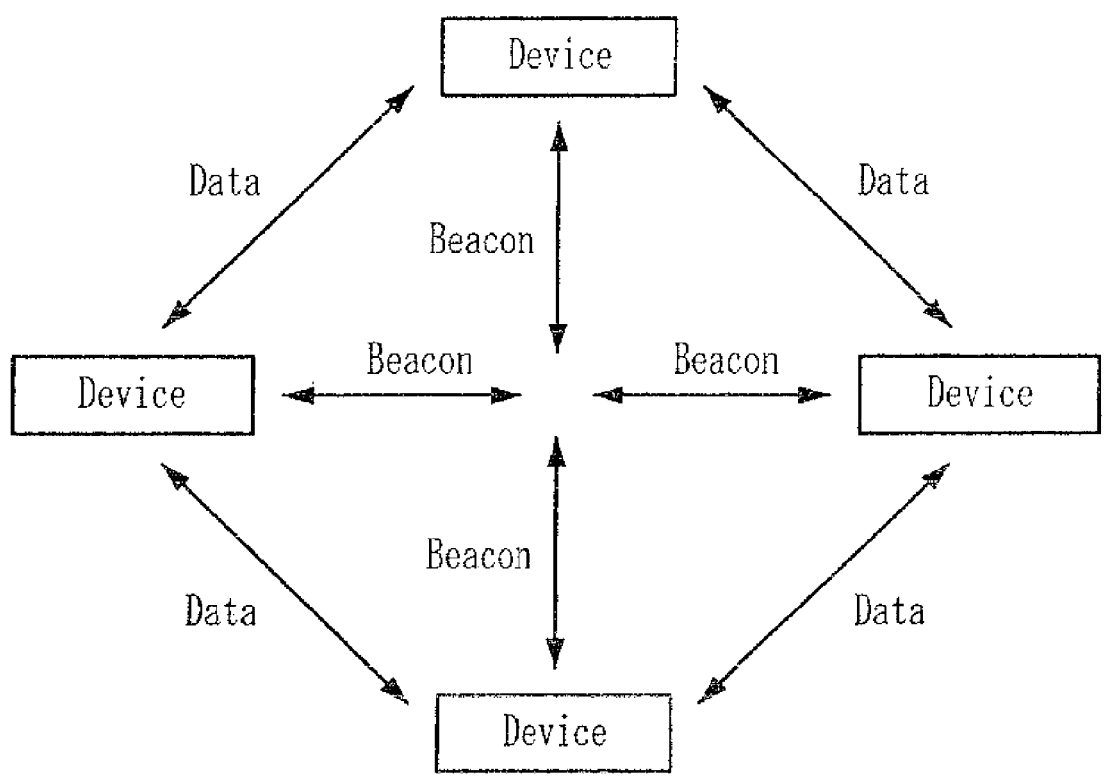
FIG. 1 is a view for explaining a conventional piconet.
Figure 2:
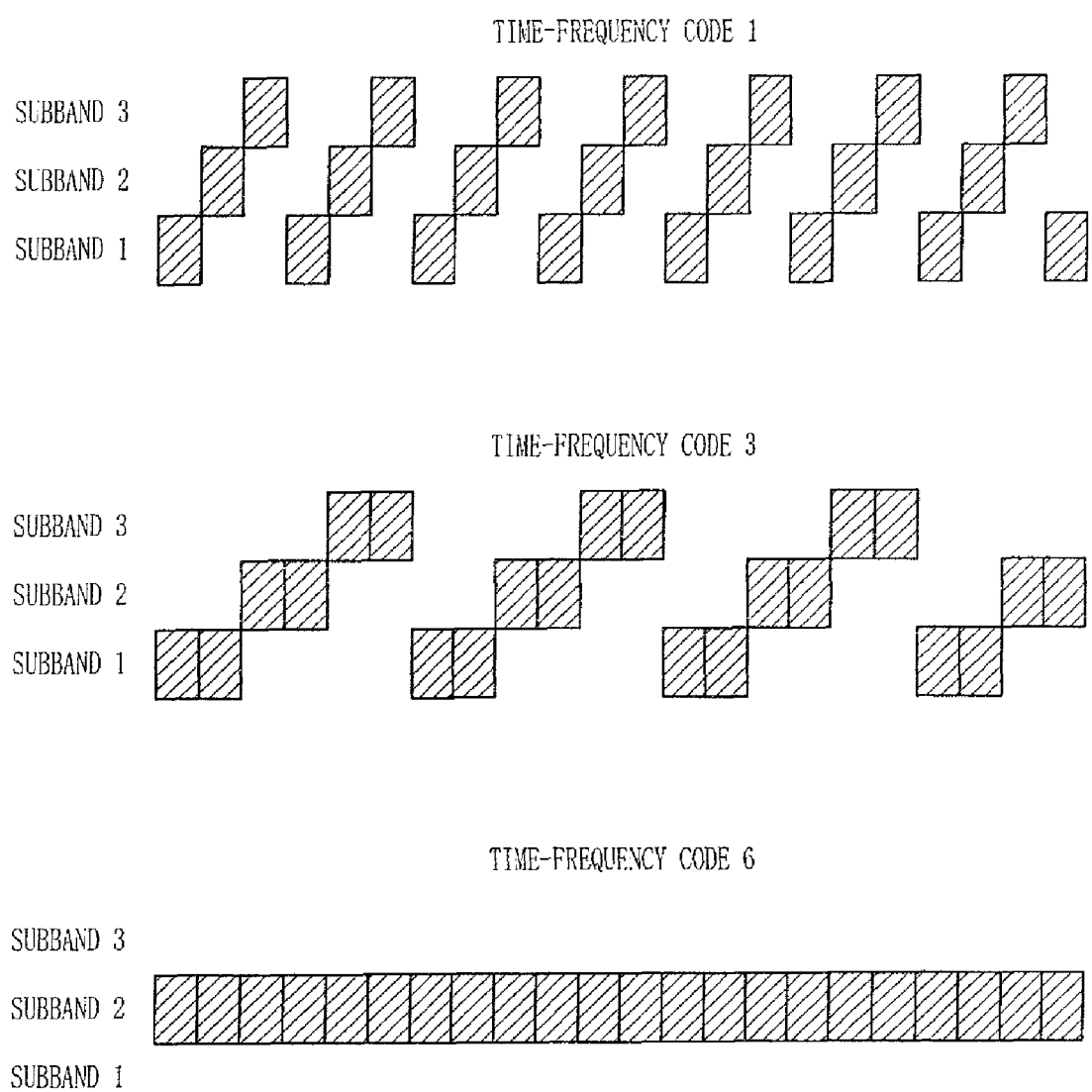
FIG. 2 is a view for explaining a frequency hopping procedure according to time in a conventional UWB system.
Figure 3:
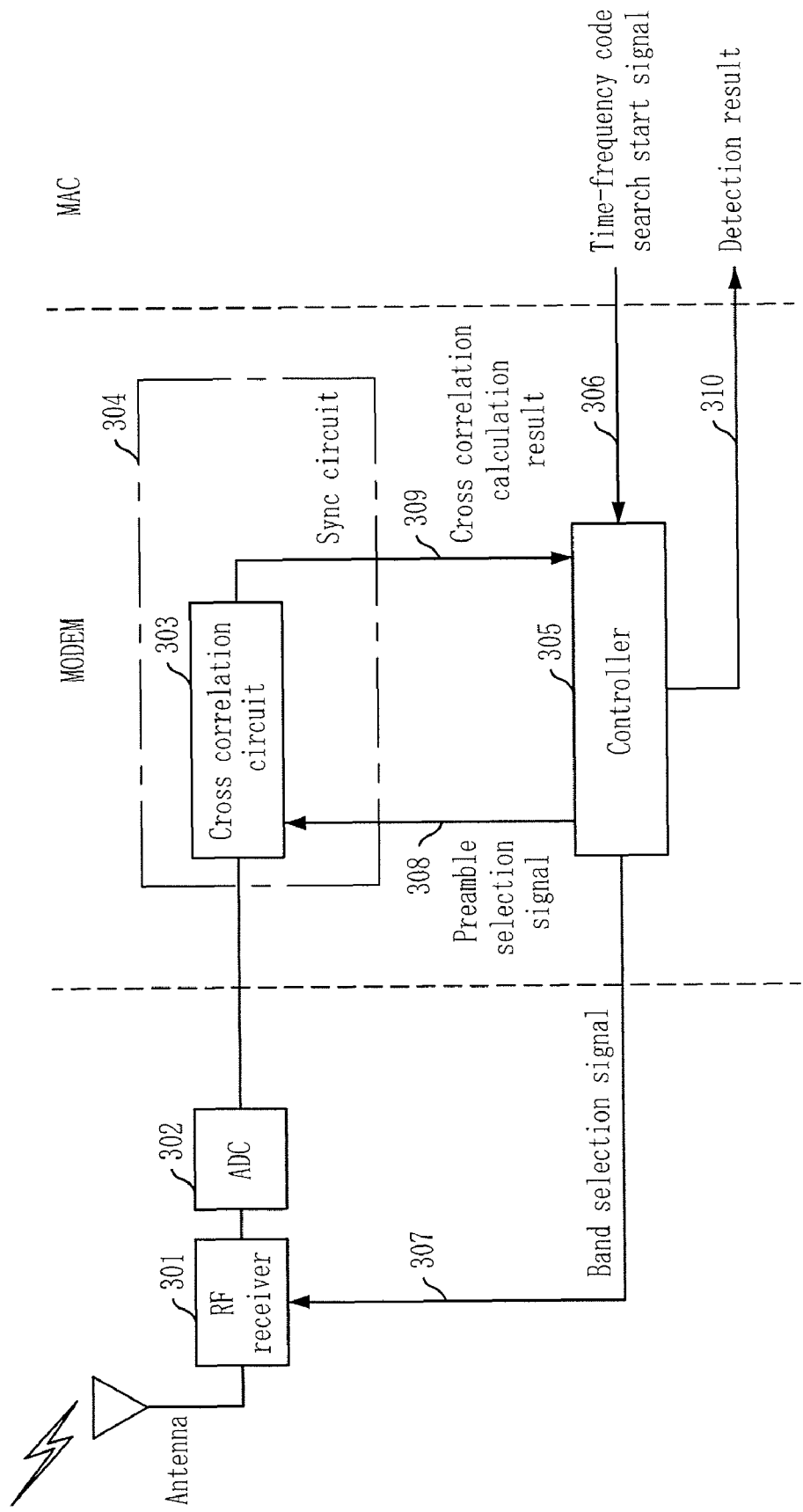
FIG. 3 is a functional block diagram for explaining a procedure of detecting a time-frequency code in an MB-OFDM UWB receiving apparatus in accordance with a preferred embodiment of the present invention.

FIG. 3 is a functional block diagram for explaining a procedure of detecting a time-frequency code in an MB-OFDM UWB receiving apparatus in accordance with a preferred embodiment of the present invention. In the drawing, reference numeral 301 represents a radio frequency (RF) receiver, reference numeral 302 denotes an analog-to-digital converter (ADC), reference numeral 303 denotes a cross correlation circuit, reference numeral 304 designates a synchronizing circuit, and reference numeral 305 denotes a controller.

When a time-frequency code detection start signal 306 is received from an MAC layer of a UWB system, the controller 305 within a modem outputs a preamble selection signal 308 and a band selection signal 307 according to a time-frequency code detection method. The band selection signal 307 is applied to the RF receiver 301 to determine a reception frequency subband.

In the meantime, a signal received over a radio channel is inputted to the cross correlation circuit 303 through the RF receiver 301 and the ADC 302. The cross correlation circuit 303 obtains a cross correlation between an internal preamble pattern and the inputted signal. The circuit that obtains the cross correlation is necessary for synchronizing process of received signal in a receiver of the modem using a preamble.

For the purpose, the cross correlation circuit 303 in the synchronizing circuit 304 of the modem is used.

The cross correlation circuit 303 stores all preamble patterns in a storing place prepared therein, and selects a preamble to be internally calculated in response to the preamble selection signal 308 from the controller 305. If the cross correlation circuit 303 derives the cross correlation with the same preamble as that inputted to the modem receiver, it generate a peak as a result 309 of the cross correlation. Upon generation of the peak, the controller 305 can know the preamble pattern of the signal inputted to the modem receiver, and thus can detect a time-frequency code by using it. A result 310 detected by the controller 305 is delivered to the MAC layer.

A method for detecting a time-frequency code in accordance with the present invention is performed largely in four steps. Details of these steps will be given below with reference to FIGS. 4 and 5.

First, in the first step, channels 1, 2, and 5 are detected; in the second step, channels 3 and 4 are detected; in the third step, channel 6 is detected; and in the fourth step, channel 7 is detected.

In case of using the channels 1, 2 and 5, each preamble pattern is receivable once every minimum 3 symbols in a frequency subband 1. At this time, at the RF receiver, the subband is fixed to 1 and the preamble of the cross correlation circuit is replaced once every 4 symbols (P1→P2→P5→P1→P2→P5, . . . ). The preamble selection signal and the band selection signal generated by the controller 305 are as follows:

TABLE 2

| | Symbol | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Preamble selection signal | 1 | 1 | 1 | 1 | 2 | 2 | 2 | 2 | 5 | 5 | 5 | 5 | Repeat from beginning |
| Band selection signal | 1 | 1 | 1 | 1 | 1 | 1 | 1 | 1 | 1 | 1 | 1 | 1 | 1 |

Figure 4:
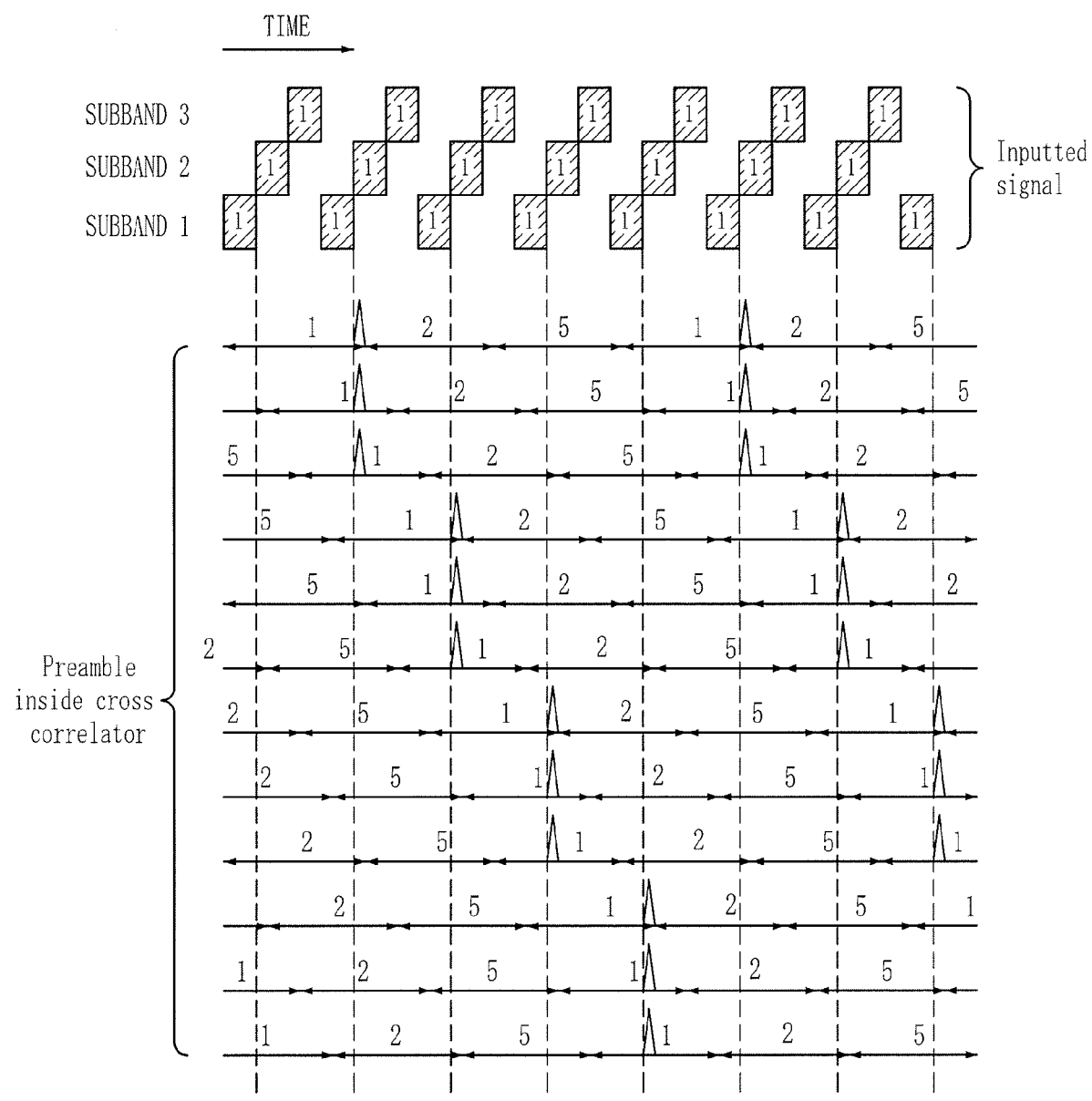
FIG. 4 is a view for explaining an example of detecting a peak of cross correlation value in accordance with the present invention.

FIG. 4 represents all preamble circulation sequences that may be generated in the first step of the invention when a signal whose time-frequency code is 1 is inputted. There are a total of 12 preamble circulation sequences. The peak of a cross correlator is generated when the selected preamble pattern of the cross correlation circuit completely surrounds one symbol interval of the input signal while using the same preamble as the OFDM symbol inputted through the ADC. Referring to FIG. 4, the preamble pattern selected in the cross correlation circuit overlaps with one symbol of the OFDM symbol inputted through the band 1 within maximum 13 OFDM symbols, and therefore, the peak can be obtained as the result of the cross correlation.

Figure 5:
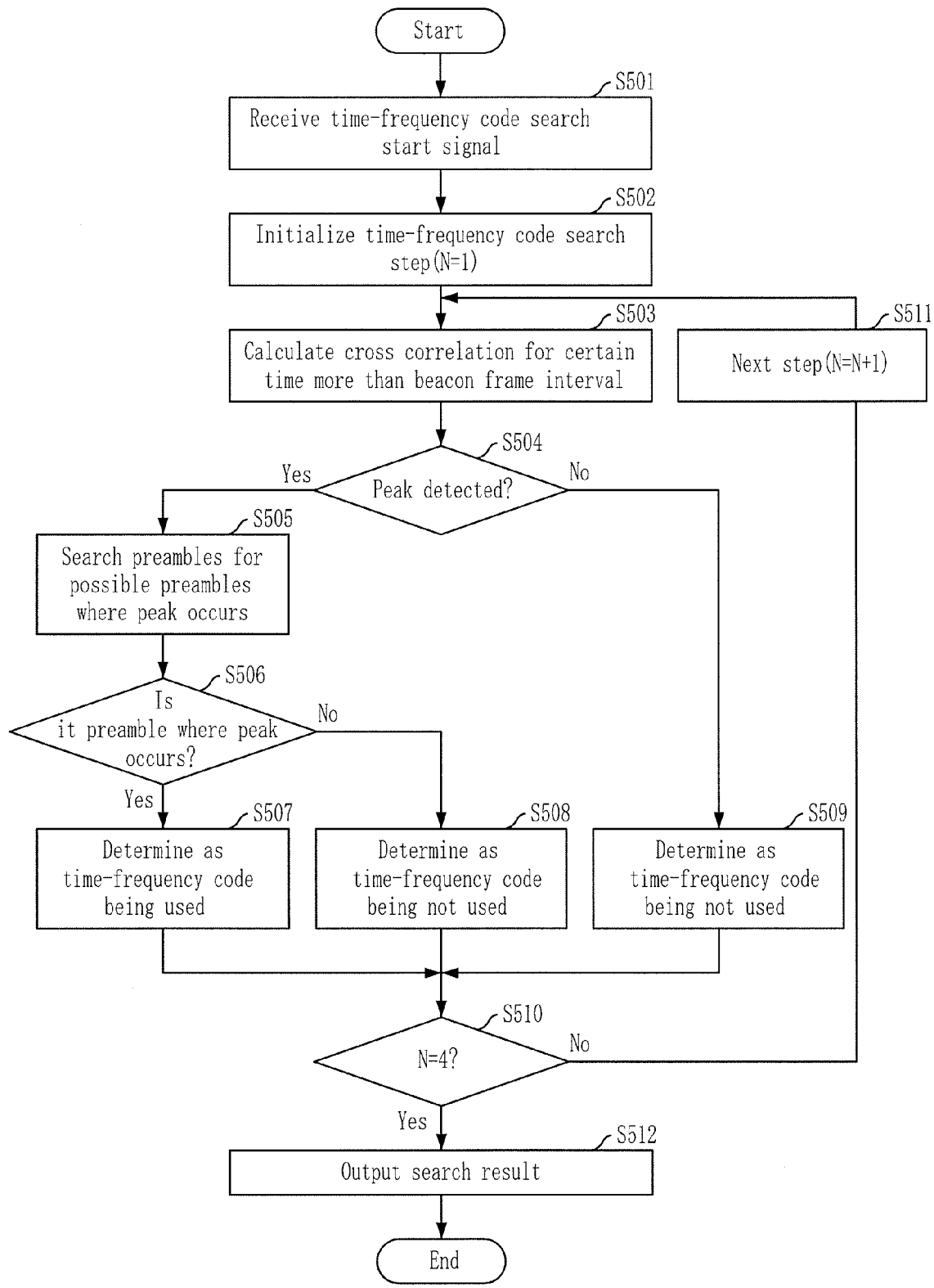
FIG. 5 is a flowchart illustrating a method for detecting a time-frequency code in accordance with another preferred embodiment of the present invention.

FIG. 5 is a flowchart for explaining a method for detecting a time-frequency code in accordance with another embodiment of the present invention.

First, upon receipt of a time-frequency search start signal from an MAC layer in step S501, the controller initializes a time-frequency code search step in step S502. That is, the controller initializes a variable N meaning step as "1".

Then, the cross correlation circuit calculates a cross correlation value by using Table 2 shown above while maintaining the preamble selection signal and the band selection signal for a certain time period more than a beacon frame interval in step S503. When a peak occurs in the cross correlation value for the certain time period more than the beacon frame interval in step S504, the controller searches preambles for possible preambles where the peak occurs in step S505, and checks in step S506 whether a searched possible preamble is the preamble where the peak occurs.

As the checking result, if the searched possible preamble is the preamble where the peak occurs, the controller determines a time-frequency code using the preamble where the peak occurs as being currently used in a piconet in step S507. On the other hand, as the checking result in step S506, if the searched possible preamble is not the preamble where the peak occurs, the controller determines it as not used in the piconet in step S508.

Meanwhile, if no peak occurs in the cross correlation value for the certain time period more than the beacon frame interval in step S504, the controller determines the time-frequency codes 1, 2, and 5 in the first step as those being not used in step S509.

For example, during the execution of the first step, if it is assumed that peak is detected from the cross correlation circuit when the preamble selection signal is 1 and no peak is detected when the preamble selection signals are 2 and 5, the time-frequency code 1 is determined as that being used, and the time-frequency codes 2 and 5 are determined as those being not used.

When the first step has been completed, the controller increases N by 1 in step S511 and carries out the second step. The second step is the step that detects channels 3 and 4. Referring to Table 1, the time-frequency codes 3 and 4 are receivable at least once every six symbols through the band 1. At this time, if the preamble of the cross correlation circuit is replaced by the codes 3 and 4 at intervals of six symbols, overlapping preambles occur within 12 symbols, so that the cross correlation circuit can detect a peak. The preamble selection signal and the band selection signal generated by the controller in the second step are as follows:

TABLE 3

| | Symbol | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Preamble selection signal | 3 | 3 | 3 | 3 | 3 | 3 | 4 | 4 | 4 | 4 | 4 | 4 | Repeat from beginning |
| Band selection signal | 1 | 1 | 1 | 1 | 1 | 1 | 1 | 1 | 1 | 1 | 1 | 1 | 1 |

Using Table 3, the cross correlation circuit calculates a cross correlation value while maintaining the preamble selection signal and the band selection signal for a certain time period more than a beacon frame interval in step S503. If a peak occurs in the cross correlation value for the certain time period more than the beacon frame interval in step S504, the controller determines a time-frequency code using a preamble where the peak occurs as that being currently used in the piconet in step S507. If no peak occurs, it determines the time-frequency codes 3 and 4 as those being not used in step S509.

The third step is the step of detecting the channel 6 when the band 1 is not used, and the fourth step is the step of detecting the channel 7 when the band 1 is not used.

First, the generation signal of the controller for detecting the time-frequency code 6 (the third step) for each symbol section is as follows.

That is, the third step calculates a cross correlation value while maintaining the preamble selection signal as "6" and the band selection signal as "2" for a predetermined time period more than a beacon frame interval in step S503. As the result of the calculation of cross correlation value, if a peak is detected, the controller determines the time-frequency code 6 as that being used, and if no peak is detected, it determines the time-frequency code 6 as that being not used.

Next, the process proceeds to the step of detecting the time-frequency code 7.

The step of detecting the time-frequency code 7 (the fourth step) calculates a cross correlation value while maintaining the preamble selection signal as "7" and the band selection signal as "3" for a predetermined time more than a beacon frame interval in step S503. As the result of the calculation of cross correlation value, if a peak is detected, the controller determines the time-frequency code 7 as that being used, and if no peak is detected, it determines the time-frequency code 7 as that being not used. Subsequently, when the time-frequency code detection has been finished for all the steps, the controller outputs the search result to the MAC layer in step S512.

In the present invention, the cross correlation circuit has a threshold value verified by experiments in advance so as to detect the peak of the cross correlation value.

The method for detecting a time-frequency code of the present invention can also be applied to the MB-OFDM UWB band groups 2 to 4 that have different preambles but use the same time-frequency hopping scheme.

As described above, the present invention can reduce the number of steps of detecting a time-frequency code between a physical layer and an upper layer that controls the physical layer, in detecting the time-frequency code that is currently in use in an MB-OFDM UWB system, thereby easily and rapidly detecting the time-frequency code and allowing a new device to access to a piconet to enable data communications.

The method of the present invention as mentioned above may be implemented by a software program that is stored in a computer-readable storage medium such as CD-ROM, RAM, ROM, floppy disk, hard disk, optical magnetic disk, or the like. This procedure may be readily carried out by those skilled in the art; and therefore, details of thereof are omitted here.

While the present invention has been described with respect to the particular embodiments, it will be apparent to those skilled in the art that various changes and modifications may be made without departing from the spirit and scope of the invention as defined in the following claims.

What is claimed is:

1. An apparatus for detecting a time-frequency code in a Multi-Band Orthogonal Frequency Division Multiplexing Ultra Wideband (MB-OFDM UWB) receiving apparatus having a Radio Frequency (RF) receiver, a modem and a Media Access Control (MAC) receiver, the apparatus comprising:

a controller for providing a band selection signal to the RF receiver and outputting a preamble selection signal at regular symbol periods to calculate a cross correlation value for a predetermined time period more than a beacon frame interval when a time-frequency code search start signal is received from the MAC receiver; and a cross correlation means for storing information on preamble patterns, selecting a preamble stored depending on the preamble selection signal from the controller, and calculating a cross correlation value for a digital signal transferred through the RF receiver, wherein the controller determines a time-frequency code using a preamble where a peak occurs as a time-frequency code that is currently in use when a peak signal is inputted based on the calculated cross correlation value from the cross correlation means, and transmits the determined time-frequency code to the MAC receiver.

2. The apparatus of claim 1, wherein the controller fixes the band selection signal to "1", and checks whether a peak is detected based on the calculated cross correlation value for a predetermined time period more than a beacon frame interval while repeatedly outputting a preamble selection signal 1 for 4 symbols, a preamble selection signal 2 for 4 symbols, and a preamble selection signal 5 for 4 symbols.

3. The apparatus of claim 1, wherein the controller fixes the band selection signal to "1", and checks whether a peak is detected based on the calculated cross correlation value for a predetermined time period more than a beacon frame interval while repeatedly outputting a preamble selection signal 3 for 6 symbols and a preamble selection signal 4 for 6 symbols.

4. The apparatus of claim 1, wherein the controller fixes the band selection signal to "2" and the preamble selection signal to "6", and checks whether a peak is detected based on the calculated cross correlation value for a predetermined time period more than a beacon frame interval.

5. The apparatus of claim 1, wherein the controller fixes the band selection signal to "3" and the preamble selection signal to "7", and checks whether a peak is detected based on the calculated cross correlation value for a predetermined time period more than a beacon frame interval.

6. The apparatus of claim 1, wherein the cross correlation means is a cross correlation circuit provided in a synchronizing circuit of the modem.

7. A method for detecting a time-frequency code in a Multi-Band Orthogonal Frequency Division Multiplexing Ultra Wideband (MB-OFDM UWB) receiving apparatus having a Radio Frequency (RF) receiver, a modem and a Media Access Control (MAC) receiver, comprising the steps of:

a) at the modem, receiving a time-frequency code search start signal from the MAC receiver;
b) at the modem, selecting a subband depending on a band selection signal and calculating a cross correlation value for an input signal for a predetermined time period more than a beacon frame interval while changing a preamble selection signal;
c) at the modem, if a peak is detected based on the cross correlation value calculated in the step b), searching a preamble where the peak occurs;
d) at the modem, if a preamble where the peak occurs is searched in the step c), determining a time-frequency code using a preamble where the peak occurs as a time-frequency code that is currently in use;
e) at the modem, repeatedly performing the steps b) to d) for all preambles; and
f) at the modem, transferring a determined time-frequency code to the MAC receiver.

8. The method of claim 7, wherein the step b) includes:
fixing the band selection signal to "1"; and
calculating a cross correlation value for a predetermined time period more than a beacon frame interval while repeatedly outputting a preamble selection signal 1 for 4 symbols, a preamble selection signal 2 for 4 symbols, and a preamble selection signal 5 for 4 symbols.

9. The method of claim 7, wherein the step b) includes:
fixing the band selection signal to "1"; and
calculating a cross correlation value for a predetermined time period more than a beacon frame interval while repeatedly outputting a preamble selection signal 3 for 6 symbols and a preamble selection signal 4 for 6 symbols.

10. The method of claim 7, wherein the step b) includes:
fixing the band selection signal to "2" and the preamble selection signal to "6"; and
calculating a cross correlation value for a predetermined time period more than a beacon frame interval.

11. The method of claim 7, wherein the step b) includes:
fixing the band selection signal to "3" and the preamble selection signal to "7"; and
calculating a cross correlation value for a predetermined time period more than a beacon frame interval.

* * * * *